United States Patent
Maass

(10) Patent No.: US 8,919,846 B2
(45) Date of Patent: Dec. 30, 2014

(54) DAYLIGHT OPENING SYSTEM FOR VEHICLE

(71) Applicant: SRG Global, Inc., Warren, MI (US)

(72) Inventor: Klaus-Peter Maass, Viersen (DE)

(73) Assignee: SRG Global, Inc., Warren, MI (US)

( * ) Notice: Subject to any disclaimer, the term of this patent is extended or adjusted under 35 U.S.C. 154(b) by 0 days.

(21) Appl. No.: 13/869,542

(22) Filed: Apr. 24, 2013

(65) Prior Publication Data

US 2013/0292964 A1 Nov. 7, 2013

Related U.S. Application Data

(60) Provisional application No. 61/642,508, filed on May 4, 2012.

(51) Int. Cl.
*B60J 10/04* (2006.01)
*B60J 5/04* (2006.01)

(52) U.S. Cl.
CPC ............. *B60J 10/042* (2013.01); *B60J 5/0402* (2013.01)
USPC .......................... 296/1.08; 296/146.2; 49/502

(58) Field of Classification Search
USPC ................... 296/1.08, 146.2, 146.15, 146.16; 49/502, 440, 441, 348, 349, 475.1, 49/489.1, 495.1
See application file for complete search history.

(56) References Cited

U.S. PATENT DOCUMENTS

| | | | |
|---|---|---|---|
| 4,875,307 A | 10/1989 | Barbero | |
| 5,014,464 A | 5/1991 | Dupuy et al. | |
| 5,317,835 A | 6/1994 | Dupuy et al. | |
| 5,611,550 A | 3/1997 | Belser | |
| 5,702,148 A * | 12/1997 | Vaughan et al. | ........... 296/146.9 |
| 5,743,047 A | 4/1998 | Bonne et al. | |
| 5,899,022 A | 5/1999 | Gaw, Jr. et al. | |
| 6,138,338 A | 10/2000 | Berry | |

(Continued)

FOREIGN PATENT DOCUMENTS

| | | |
|---|---|---|
| CA | 2691979 A1 | 1/2009 |
| CA | 2742836 A1 | 4/2010 |

(Continued)

OTHER PUBLICATIONS

International Search Report and Written Opinion regarding Application No. PCT/US2010/003062 issued Jun. 5, 2012.

(Continued)

*Primary Examiner* — Dennis H Pedder
*Assistant Examiner* — Beverly Becker
(74) *Attorney, Agent, or Firm* — Harness, Dickey & Pierce, PLC

(57) ABSTRACT

An apparatus for use with a vehicle window opening may include a carrier, at least one molding member, at least one trim piece, a nut and a fastener. The carrier may have a first attachment feature and a second attachment feature. The at least one molding member may be removably secured to the first attachment feature of the carrier. The at least one trim piece may be removably secured to the second attachment feature of the carrier and arranged adjacent the at least one molding member. The nut may be connected to the carrier or the vehicle window opening. The fastener may extend between the vehicle window opening and the carrier and may engage the nut to removably secure the carrier, the at least one trim piece, and the at least one molding member to the vehicle window opening.

28 Claims, 6 Drawing Sheets

(56) References Cited

U.S. PATENT DOCUMENTS

| | | |
|---|---|---|
| 6,409,251 B1 | 6/2002 | Kaye et al. |
| 6,612,074 B1 | 9/2003 | Kaye et al. |
| 6,641,204 B2 | 11/2003 | Ogawa et al. |
| 6,679,003 B2 | 1/2004 | Nozaki et al. |
| 6,692,245 B1 | 2/2004 | Lanoue et al. |
| 6,702,301 B1 | 3/2004 | Davies et al. |
| 6,729,674 B2 | 5/2004 | Davis et al. |
| 6,817,651 B2 | 11/2004 | Carvalho et al. |
| 7,052,021 B2 | 5/2006 | Plottnik |
| 7,086,201 B2 | 8/2006 | Struyven et al. |
| 7,118,169 B2 | 10/2006 | Hara et al. |
| 8,205,389 B1 | 6/2012 | Kesh |
| 8,371,069 B2 | 2/2013 | O'Sullivan et al. |
| 8,479,449 B2 | 7/2013 | Titz |
| 8,561,353 B2 | 10/2013 | Terai et al. |
| 2001/0015035 A1 | 8/2001 | Nozaki |
| 2001/0025455 A1 | 10/2001 | Nozaki et al. |
| 2002/0108313 A1 | 8/2002 | Nozaki et al. |
| 2005/0155293 A1 | 7/2005 | Dron |
| 2007/0000180 A1 | 1/2007 | Oba et al. |
| 2007/0068085 A1 | 3/2007 | Ninomiya et al. |
| 2007/0137112 A1 | 6/2007 | Furuzawa et al. |
| 2007/0187988 A1 | 8/2007 | Koshimichi |
| 2007/0220811 A1 | 9/2007 | Flendrig et al. |
| 2007/0251152 A1 | 11/2007 | Takase et al. |
| 2008/0030046 A1 | 2/2008 | Krause |
| 2008/0178531 A1 | 7/2008 | Takeuchi et al. |
| 2009/0241430 A1* | 10/2009 | Knape .................. 49/489.1 |
| 2011/0126473 A1 | 6/2011 | Prater et al. |
| 2013/0292965 A1 | 11/2013 | Prater et al. |

FOREIGN PATENT DOCUMENTS

| | | |
|---|---|---|
| DE | 69000419 T2 | 4/1993 |
| EP | 0384851 A2 | 8/1990 |
| EP | 0384852 A2 | 8/1990 |
| FR | 2913215 A1 | 9/2008 |
| KR | 20080000195 A | 1/2008 |
| WO | 0006406 A1 | 2/2000 |
| WO | 2007022355 A2 | 2/2007 |
| WO | 2008084320 A1 | 7/2008 |
| WO | 2008132302 A2 | 11/2008 |
| WO | 2009124382 A1 | 10/2009 |

OTHER PUBLICATIONS

International Search Report and Written Opinion regarding Application No. PCT/us2010/003062 dated Mar. 9, 2011.

International Search Report and Written Opinion regarding Application No. PCT/US2013/039385 dated Sep. 17, 2013.

International Search Report and Written Opinion regarding Application No. PCT/US2013/039387 dated Sep. 23, 2013.

Office Action regarding U.S. Appl. No. 13/869,627 mailed Jul. 18, 2014.

* cited by examiner

DAYLIGHT OPENING SYSTEM FOR VEHICLE

CROSS-REFERENCE TO RELATED APPLICATIONS

This application claims the benefit of U.S. Provisional Application No. 61/642,508, filed on May 4, 2012. The entire disclosure of the above application is incorporated herein by reference.

FIELD

The present disclosure relates to a daylight opening system, and more particularly, to a modular daylight opening system for a vehicle.

BACKGROUND

This section provides background information related to the present disclosure and is not necessarily prior art.

Daylight opening systems are installed in a wide variety of vehicles to permit natural light to enter the vehicle and to provide outside visibility for the vehicle operator. Daylight opening systems also assist in protecting the vehicle interior from external elements (e.g., rain, snow, debris and/or noise). Typical daylight opening systems contain multiple components provided by multiple suppliers and assembled on the vehicle at the vehicle assembly plant. The attachment mechanisms for these multiple components are often arranged within interior componentry of the vehicle to aesthetically appease the vehicle operator. Accordingly, fit/function and ease of replacement are compromised in favor of these design and supply considerations.

SUMMARY

This section provides a general summary of the disclosure, and is not a comprehensive disclosure of its full scope or all of its features.

The present disclosure provides an apparatus for use with a vehicle window opening may include a carrier, at least one molding member, at least one trim piece, a nut and a fastener. The carrier may have a first attachment feature and a second attachment feature. The at least one molding member may be removably secured to the first attachment feature of the carrier. The at least one trim piece may be removably secured to the second attachment feature of the carrier and arranged adjacent the at least one molding member. The nut may be connected to the carrier or the vehicle window opening. The fastener may extend between the vehicle window opening and the carrier and may engage the nut to removably secure the carrier, the at least one trim piece, and the at least one molding member to the vehicle window opening.

In another form, the present disclosure provides an apparatus that may include a carrier, at least one molding member, at least one trim piece, and a fastener. The carrier may have a first attachment feature, a second attachment feature, and an integrally formed nut. The at least one molding member may be removably secured to the first attachment feature of the carrier. The at least one trim piece may be removably secured to the second attachment feature of the carrier and arranged adjacent the at least one molding member. The fastener may extend between the vehicle window opening and the integrally formed nut of the carrier for removably securing the carrier to the vehicle window opening.

In another form, the present disclosure provides a vehicle that may include a door frame, a window opening, and a daylight opening system. The window opening may be arranged in the door frame. The daylight opening system may be mounted to the door frame. The light opening system may include a carrier, at least one molding member, and at least one trim piece. The carrier may be mounted to the door frame proximate the window opening with at least one fastener extending through the door frame. The carrier may include a plurality of attachment features for removably securing the molding member and the trim piece thereto.

In yet another form, the present disclosure provides a method for securing a daylight opening system to a vehicle window opening. A trim piece is pressed onto a first attachment feature of a carrier of the daylight opening system. A molding member is then removably secured onto a second attachment feature of the carrier, adjacent to the trim piece. A fastener can then be extended through a door frame proximate the vehicle window opening. Finally, the carrier, trim piece, and molding member can be fastened to the vehicle window opening by rotating the fastener into an integrally formed nut in the carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
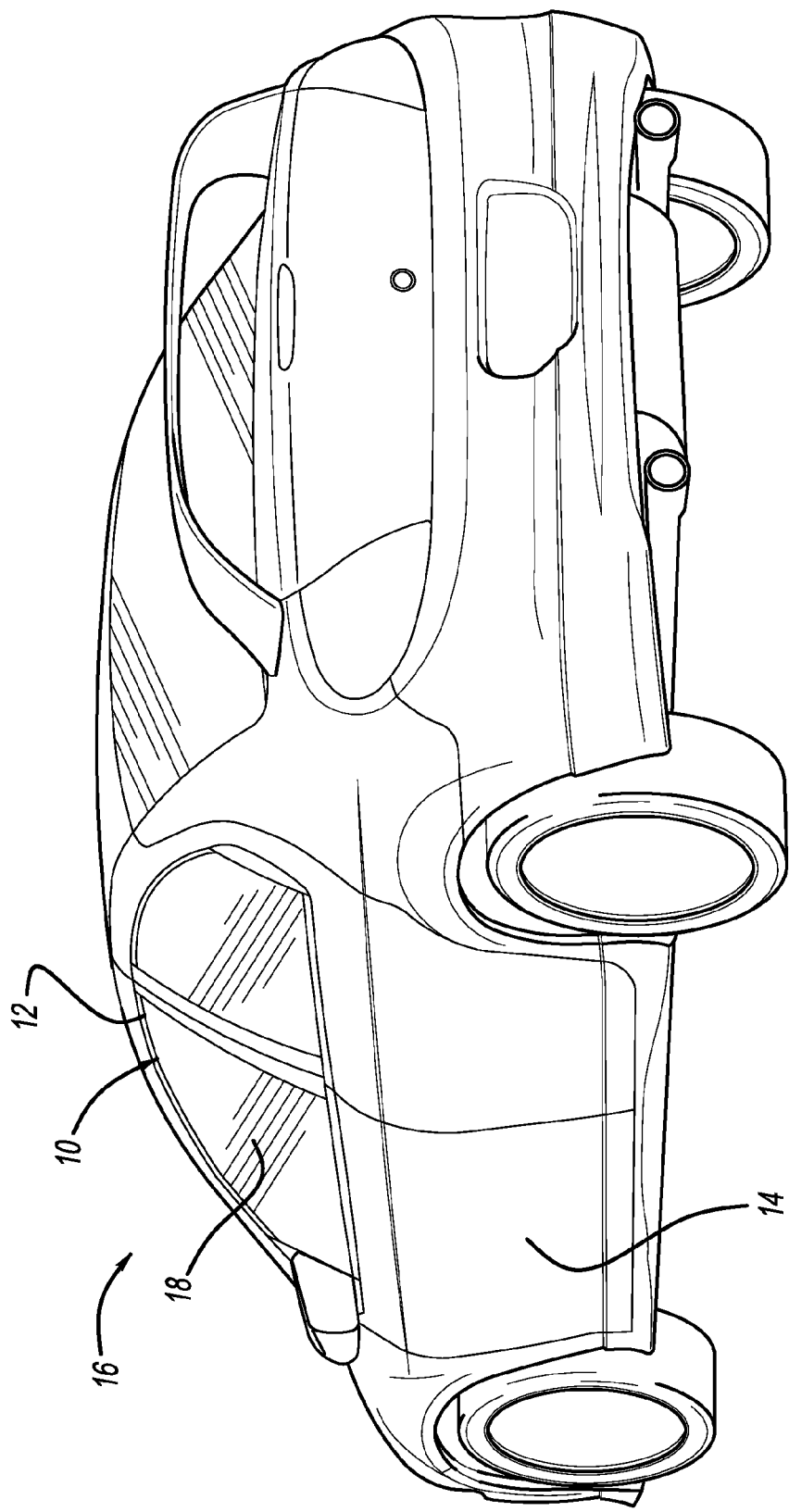
FIG. 1 is a perspective view of a vehicle having a daylight opening system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated ninety degrees or at other orientations) and the spatially relative descriptors used herein interpreted accordingly.

With reference to FIGS. 1-6, a daylight opening system 10 according to the principles of the present disclosure is provided. With particular reference to FIG. 1, the daylight opening system 10 may be secured to a window opening 12 in a door frame 14 of a vehicle 16 in order to improve fit and finish of a window pane 18 within the window opening 12, as will be described in more detail below. As shown, the daylight opening system 10 is designed for assembly to a front driver's side window opening. It should be appreciated, however, that the daylight opening system 10 may be reconfigured to accommodate any of the other window openings 12 in the vehicle 16. Furthermore, the vehicle 16 may be any type of vehicle, including an automotive vehicle such as a car, pickup truck, sport utility vehicle, crossover vehicle, minivan, van, light commercial vehicle, heavy-duty commercial or industrial vehicle, military vehicle, construction or farm equipment or vehicle, or recreational vehicle, for example. It should also be appreciated that the vehicle 16, regardless of the type or class, could include any number of daylight opening systems 10, which correspond to the number of vehicle window openings 12.

Figure 2:
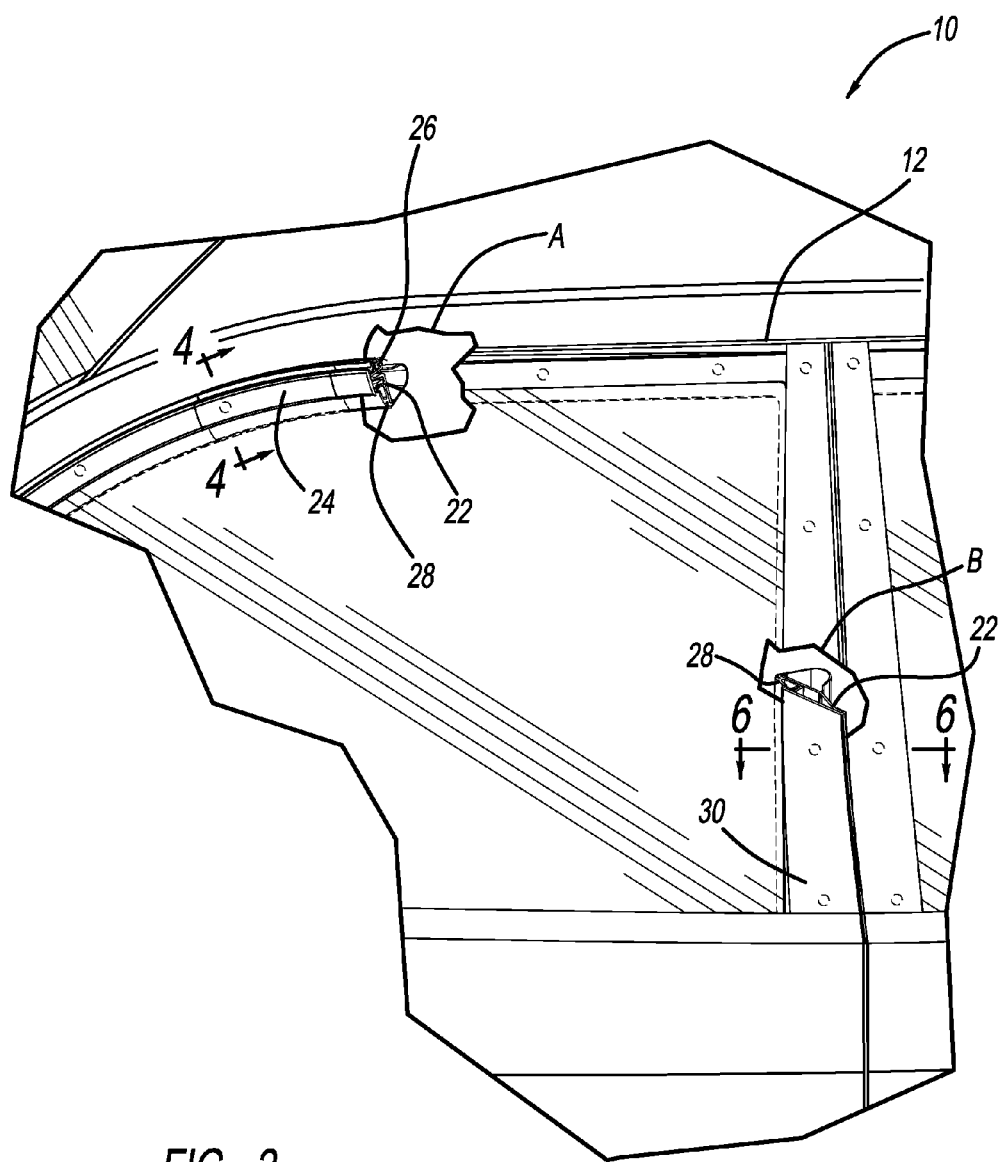
FIG. 2 is a portion of a perspective view of the daylight opening system of FIG. 1.

Referring now to FIG. 2, the daylight opening system 10 is shown broken away at an upper section A and a side section B. The daylight opening system 10 at the upper section A is shown to include a carrier 22, one or more appliques (e.g., trim piece 24), a gap seal 26, and a garnish molding 28. The daylight opening system 10 at the side section B is shown to include the carrier 22, the garnish molding 28, and the one or more applique (e.g., pillar applique 30). As should be understood, the carrier 22 may change configuration around the window opening 12 to accommodate the specific shapes of mating components.

Figure 3:
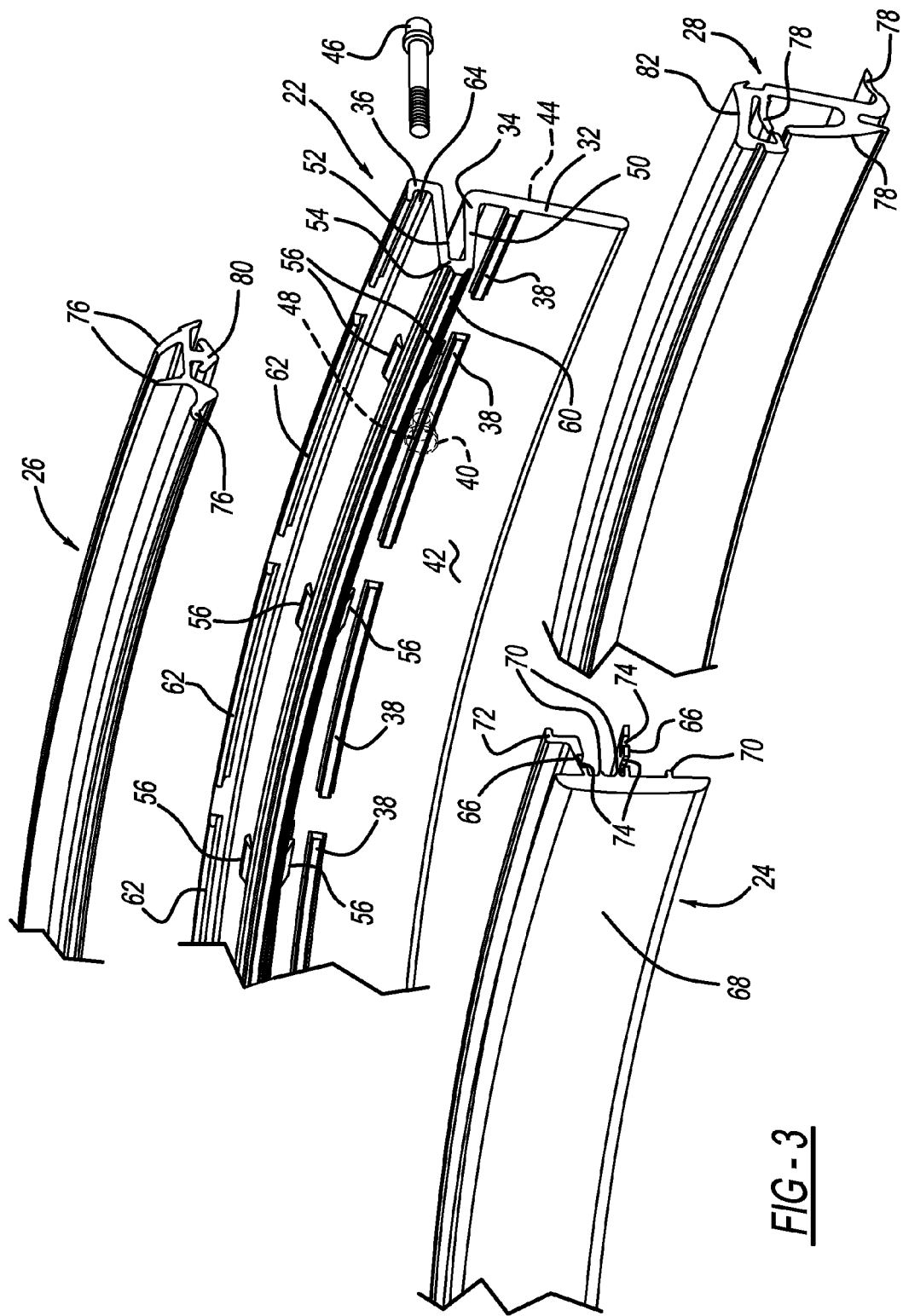
FIG. 3 is an exploded perspective view of an upper portion of the daylight opening system of FIG. 2.
Figure 4:
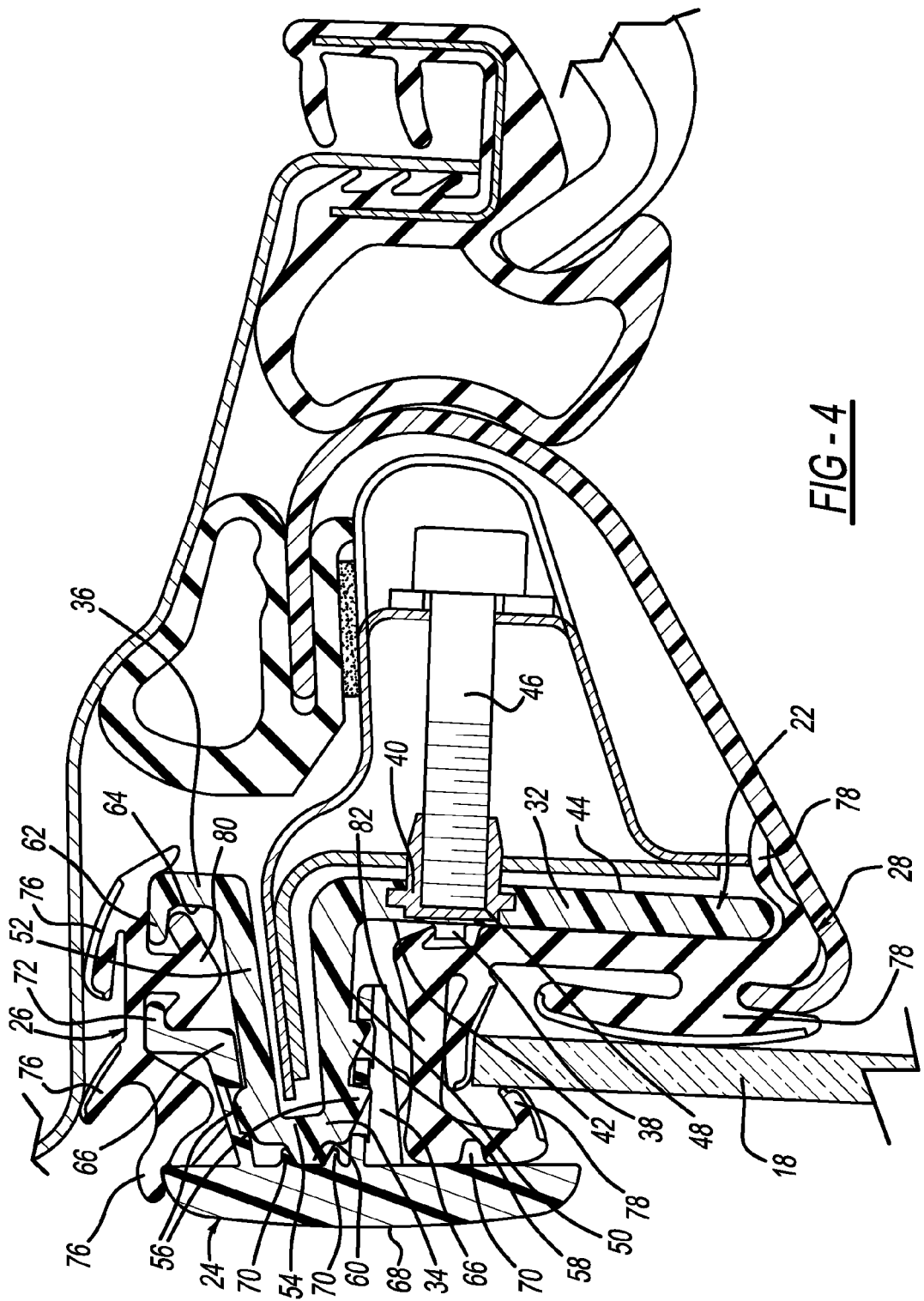
FIG. 4 is a cross-sectional view of the daylight opening system including a carrier secured to a door panel and taken through line 4-4 of FIG. 2.

At the upper section A shown in FIG. 3 and in cross-section in FIG. 4, the carrier 22 may define a first attachment feature or flange 32, a second attachment feature or channel member 34, and a third attachment feature or flange 36. The flange 32 may be a generally flat, elongate member extending substantially parallel to the window pane 18 and may include a plurality of projections 38 and at least one integrally formed nut 40. The projections 38 may extend outwardly (e.g., in a direction towards the vehicle exterior) from a first surface 42 of the flange 32. Conversely, the integrally formed nut 40 may extend from a second surface 44 of the flange 32, opposite the first surface 42, for receipt of a fastener 46. The integrally formed nut 40 may have a closed or blind end 48 adjacent the first surface 42. The integrally formed nut 40 may be insert molded or pressed into the carrier 22 through known methods.

The channel member 34 may extend in a generally u-shaped configuration and may include a first leg 50 and a second leg 52 interconnected by a closed end 54. The first and second legs 50, 52 may define a plurality of oppositely protruding barbs 56 arranged near the closed end 54. The second leg 52 may also include another row of barbs 58 inset along the leg 52 apart from the barbs 56. The closed end 54 may have a protuberance 60 extending opposite the first and second legs 50, 52 along the length of the closed end 54. The flange 32 and the channel member 34 may be integrally formed, such that the first leg 50 of the channel member 34 and the flange 32 have an inclusive angle greater than or equal to approximately ninety degrees. Likewise, the channel member 34 may be integrally formed with the flange 36, such that the second leg 52 of the channel member 34 and the flange 36 have an inclusive angle greater than or equal to approximately ninety degrees.

The flange 36 may be substantially coplanar with the flange 32 and may include a discontinuous lip portion 62 extending perpendicularly outward (e.g., in a direction towards the vehicle exterior) from a surface 64 of the flange 36. It should be understood that while each of the projections 38, barbs 56, and lip portions 62 are shown and described as being discontinuous, it is contemplated that they may also be provided as continuous projections extending across the carrier 22. Likewise, while the protuberance 60 is shown and described as being continuous across the length of the closed end 54, it is also contemplated that the protuberance 60 may be discontinuous, or in other words, may be provided as a plurality of protuberances across the length of the closed end 54.

The remaining components in the upper section A of the daylight opening system 10 may include features designed for attachment to the carrier 22. In particular, the trim piece 24 may include a pair of inwardly projecting arms 66, an exterior facing surface 68, a plurality of aligning members 70, and a lip member 72 extending from one of the arms 66. The arms 66 may be sized and arranged to extend about the channel member 34 and may define indentions 74 correspondingly sized and located with the barbs 56, 58 of the channel member 34. In this way, the trim piece 24 may be removably received on the carrier 22 such that the exterior facing surface 68 may define a peripheral border for the window opening 12. The aligning members 70 may assist in aligning and spacing the trim piece 24 about the window opening 12 and away from the gap seal 26 and garnish molding 28. Furthermore, the lip member 72 may be aligned with the lip portion 62 of the flange 36 to provide a channel opening for receipt of the gap seal 26.

Both the gap seal 26 and the garnish molding 28 may include a plurality of sealing members 76, 78 and an anchor member 80, 82, respectively. The sealing members 76, 78 may engage the vehicle 16 (e.g., vehicle frame) and the trim piece 24 for preventing moisture, dirt, noise and/or debris or foreign objects from entering the interior of the vehicle 16. The anchor member 80 may extend from the gap seal 26 and into the channel provided by the lip member 72 and the lip portion 62 for locking the gap seal 26 to the carrier 22. Likewise, the anchor member 82 may extend from the garnish molding 28 and into a channel defined by the projections 38 and the aligning members 70 for locking the garnish molding 28 to the carrier 22. Both the gap seal 26 and the garnish molding 28 may be shaped to extend around the carrier 22 for additional retention thereto.

Figure 5:
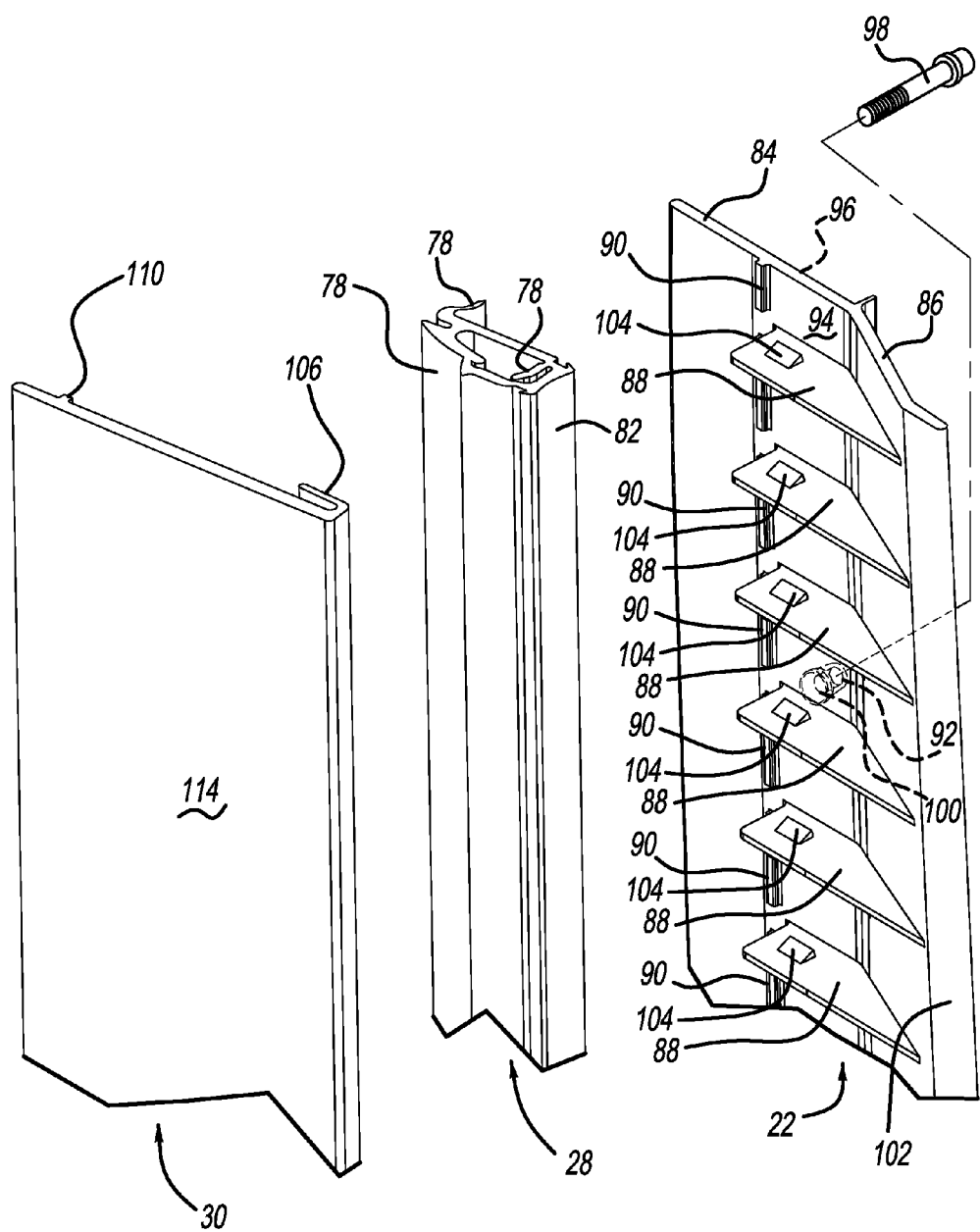
FIG. 5 is an exploded perspective view of a pillar portion of the daylight opening system of FIG. 2.
Figure 6:
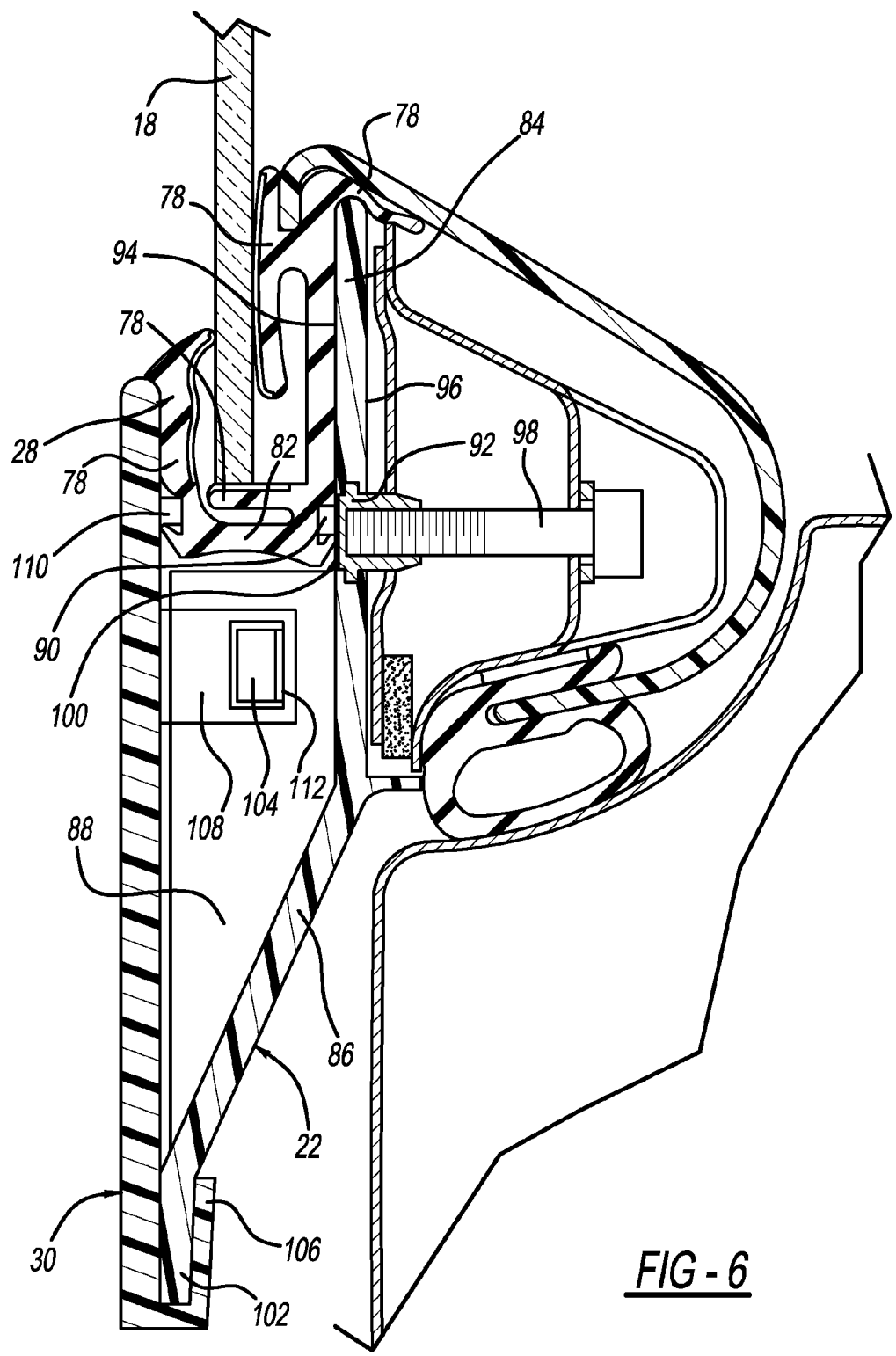
FIG. 6 is a cross-sectional view of the daylight opening system including the carrier secured to the door panel and taken through line 6-6 of FIG. 2.

At the side section B shown in FIG. 5 and in cross-section in FIG. 6, the carrier 22 may have an alternate configuration defining a flange portion 84, an arm portion 86, and a plurality of tab members 88. The flange portion 84 may be substantially similar to the flange 32. For example, flange portion 84 may extend parallel to the window pane 18 and may include a plurality of elongated projections 90 and at least one integrally formed nut 92. The projections 90 may extend outwardly (e.g., in a direction towards the vehicle exterior) from a first surface 94 of the flange portion 84. Conversely, the integrally formed nut 92 may extend outwardly from a second surface 96 of the flange portion 84, opposite the first surface 94, for receipt of a fastener 98. The integrally formed nut 92 may have a closed or blind end 100 adjacent the first surface 94.

The arm portion 86 may be integrally formed with the flange portion 84 and may terminate at an attachment portion 102. The arm portion 86 may be angled from the flange portion 84 to provide spacing for receipt of the garnish molding 28. For example, the arm portion 86 may be angled to provide an inclusive angle with the flange portion 84 greater than or equal to approximately ninety degrees, and more particularly, greater than or equal to 135 degrees. The attachment portion 102 may be sized and angled to receive and align the pillar applique 30. Likewise, the tab members 88, which extend perpendicularly to the flange portion 84 and the arm portion 86, may each include a barb 104 to assist in retaining and aligning the pillar applique 30.

The remaining components in the side section B of the daylight opening system 10 may include features designed for attachment to the carrier 22. In particular, the pillar applique 30 may include an inwardly projecting arm 106, a plurality of locking tabs 108, and at least one aligning member 110. The arm 106 may be sized and arranged to extend about the attachment portion 102 for aligning the pillar applique 30 with the carrier 22. Likewise, the locking tabs 108 may correspond in number and placement of the tab members 88 and may include guide slots 112 for receipt of the barbs 104. In this way, the pillar applique 30 may be removably received on the carrier 22 such that an exterior facing surface 114 may define a peripheral border for the window opening 12, similarly to the trim piece 24. The aligning members 110 may assist in aligning and spacing the pillar applique 30 about the window opening 12 and away from the garnish molding 28.

As previously described, the garnish molding 28 may include the sealing and anchor members 78, 82. In the side section B, the sealing members 78 may engage the vehicle 16 (e.g., vehicle frame) and the pillar applique 30 for preventing moisture, dirt, noise and/or debris or foreign objects from entering the interior of the vehicle 16. The anchor member 82 may extend from the garnish molding 28 and into a channel defined by the projections 90 and the aligning members 110 for locking the garnish molding 28 to the carrier 22. The garnish molding 28 may be shaped to extend around the carrier 22 for additional retention thereto.

It should be understood that while the carrier 22 is shown as having a particular configuration for attachment with the trim piece 24, the gap seal 26, the garnish molding 28, and the pillar applique 30, other configurations are contemplated and fall within the scope of this disclosure. For example, the carrier 22 may be configured for receipt of an outer sash molding, a belt molding, a mirror sail molding, a glass run channel seal, an outer door seal, and/or interior trim window garnish.

With continued reference to FIGS. 4 and 6, the daylight opening system 10 may be pre-assembled prior to shipment or may be individually mounted proximate the door frame 14. For example, if the daylight opening system 10 is provided to the customer as a pre-assembled module, the carrier 22 and all attached components may be secured to the door frame 14 of the vehicle 16 with the fasteners 46, 98 and nuts 40, 92 attachments. The fastener 46, 98 may be secured to the carrier 22 proximate an interior-facing side of the door frame 14 of the vehicle 16, allowing for access to the attachment features without deformation of any attachment componentry. Interior window garnish trim may then be assembled to the vehicle 16 to cover the carrier attachment features (e.g., fastener 46, 98 and nut 40, 92 attachments). Pre-assembly of the daylight opening system 10 may reduce the number of individual components shipped to the customer and may allow for secondary equipment to be used for assembling the module. This secondary equipment, in turn, may allow for tighter tolerancing and improved fit/finish.

Alternately, however, if the daylight opening system 10 is provided to the customer as independent components, securing the carrier 22 to the door frame 14 may still provide reduced tolerancing and improved fit/finish due to the precision dimensions of the molded in nut. For example, the outside diameter (OD) of the nut 40 may have a precision dimension (e.g., 6.00 millimeters with a tolerance of plus 0.25 millimeters and minus 0.00 millimeters) and the fastener hole in the interior-facing side of the door frame 14 of the vehicle 16 may have a corresponding precision dimension (e.g., 6.25 millimeters with a tolerance of plus 0.25 millimeters and minus 0.00 millimeters). The remaining components may be attached to the carrier 22 through normal attachment features, such as clips, molded snaps, and/or other fasteners. Again, interior window garnish trim may then be assembled to the vehicle 16 to cover the carrier attachment features (e.g., fastener 46, 98 and nut 40, 92 attachments).

While the nuts 40, 92 are described above as being attached to or integrally formed with the carrier 22 and locating the carrier 22 relative to the door frame 14, in some embodiments, one or more of the nuts 40, 92 could alternatively be attached to or integrally formed with the door frame 14. In such embodiments, one or more of the fasteners 46, 98 may be attached to or integrally formed with the carrier 22 (via insert molding, for example) and may locate the carrier 22 relative to the door frame 14.

The foregoing description of the embodiments has been provided for purposes of illustration and description. It is not intended to be exhaustive or to limit the disclosure. While exemplary dimensions and tolerances are provided above for the outside diameter of the nut 40 and the fastener hole, it will be appreciated that variations to one or both of these dimensions and/or tolerances are within the scope of the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for use with a vehicle window opening comprising:
    a carrier having a first attachment feature and a second attachment feature, said second attachment feature being in the form of a channel member having a protuberance extending from a closed end thereof;
    at least one trim piece removably secured to the second attachment feature of the carrier;
    at least one molding member removably secured to the first attachment feature of the carrier and arranged adjacent the at least one trim piece;
    a nut connected to the carrier or the vehicle window opening; and
    a fastener extending between the vehicle window opening and the carrier and engaging the nut to removably secure the carrier, the at least one trim piece, and the at least one molding member to the vehicle window opening.

2. The apparatus of claim 1, wherein the nut is integrally formed with the carrier.

3. The apparatus of claim 1, wherein the first attachment feature of the carrier is a flange member having a plurality of protrusions extending from a first surface.

4. The apparatus of claim 3, wherein the nut includes a closed end adjacent the first surface.

5. The apparatus of claim 1, further comprising a third attachment feature connected to the carrier, wherein the third attachment feature and at least a portion of the at least one trim piece define a channel for removably securing at least one sealing member to the vehicle window opening.

6. The apparatus of claim 5, wherein the third attachment feature of the carrier is a flange member having a discontinuous lip portion extending from a surface of the flange member.

7. The apparatus of claim 1, further comprising a third attachment feature connected to the carrier, wherein the third attachment feature includes a plurality of tabs extending perpendicularly to the first and second attachment features.

8. The apparatus of claim 7, wherein the trim piece includes a plurality of locking tabs secured to the plurality of extending tabs of the third attachment feature.

9. A vehicle comprising:
    a door frame;
    a window opening in the door frame; and
    a daylight opening system mounted to the door frame and including a carrier, at least one molding member, and at least one trim piece, the carrier being mounted to the door frame proximate the window opening with at least one fastener extending through the door frame, the carrier including a plurality of attachment features for removably securing the molding member and the trim piece thereto, wherein the plurality of attachment features includes a member having one of a plurality of protrusions extending from a surface thereof, a single protuberance extending therefrom, and a discontinuous lip portion extending from the surface.

10. The apparatus of claim 9, wherein the fastener extends to an integrally formed nut in the carrier.

11. The apparatus of claim 10, wherein at least one of the attachment features of the carrier is a flange member.

12. The apparatus of claim 11, wherein the integrally formed nut includes a closed end adjacent the flange member.

13. The apparatus of claim 9, wherein at least one of the attachment features and at least a portion of the trim piece define a channel for removably securing at least one sealing member to the window opening.

14. The apparatus of claim 9, wherein at least one of the attachment features includes a plurality of tabs extending perpendicularly to the window opening.

15. The apparatus of claim 14, wherein the trim piece includes a plurality of locking tabs secured to the plurality of extending tabs.

16. A method for securing a daylight opening system to a vehicle window opening, the method comprising:
    pressing a trim piece onto a second attachment feature of a carrier of the daylight opening system;
    removably securing a molding member onto a first attachment feature of the carrier, adjacent to the trim piece;
    after removably securing the molding member, removably securing a sealing member onto a third attachment feature of the carrier, adjacent to the trim piece;
    extending a fastener through a door frame proximate the vehicle window opening; and
    fastening the carrier, trim piece, and molding member to the vehicle window opening by rotating the fastener into an integrally formed nut in the carrier.

17. The method of claim 16, after pressing the trim piece onto the first attachment feature further comprising:
    snapping a plurality of locking tabs of the trim piece into a plurality of extending tabs of the carrier.

18. An apparatus for use with a vehicle window opening comprising:
    a carrier having a first attachment feature and a second attachment feature;
    at least one trim piece removably secured to the second attachment feature of the carrier;
    at least one molding member removably secured to the first attachment feature of the carrier and arranged adjacent the at least one trim piece;
    a nut connected to the carrier or the vehicle window opening;
    a fastener extending between the vehicle window opening and the carrier and engaging the nut to removably secure the carrier, the at least one trim piece, and the at least one molding member to the vehicle window opening; and
    a third attachment feature connected to the carrier, wherein the third attachment feature and at least a portion of the at least one trim piece define a channel for removably securing at least one sealing member to the vehicle window opening.

19. The apparatus of claim 18, wherein the nut is integrally formed with the carrier.

20. The apparatus of claim 18, wherein the second attachment feature of the carrier is a channel member having a protuberance extending from a closed end thereof.

21. The apparatus of claim 18, wherein the first attachment feature of the carrier is a flange member having a plurality of protrusions extending from a first surface.

22. The apparatus of claim 21, wherein the nut includes a closed end adjacent the first surface.

23. The apparatus of claim 18, wherein the third attachment feature of the carrier is a flange member having a discontinuous lip portion extending from a surface of the flange member.

24. A vehicle comprising:
a door frame;
a window opening in the door frame; and
a daylight opening system mounted to the door frame and including a carrier, at least one molding member, and at least one trim piece, the carrier being mounted to the door frame proximate the window opening with at least one fastener extending through the door frame, the carrier including a plurality of attachment features for removably securing the molding member and the trim piece thereto, wherein at least one of the attachment features and at least a portion of the trim piece define a channel for removably securing at least one sealing member to the window opening.

25. The apparatus of claim 24, wherein at least one of the attachment features includes a plurality of tabs extending perpendicularly to the window opening.

26. The apparatus of claim 25, wherein the trim piece includes a plurality of locking tabs secured to the plurality of extending tabs.

27. A vehicle comprising:
a door frame;
a window opening in the door frame; and
a daylight opening system mounted to the door frame and including a carrier, at least one molding member, and at least one trim piece, the carrier being mounted to the door frame proximate the window opening with at least one fastener extending through the door frame, the carrier including a plurality of attachment features for removably securing the molding member and the trim piece thereto,
wherein the fastener extends to an integrally formed nut in the carrier,
wherein at least one of the attachment features of the carrier is a flange member,
wherein the integrally formed nut includes a closed end adjacent the flange member.

28. An apparatus for use with a vehicle window opening comprising:
a carrier having a first attachment feature and a second attachment feature;
at least one trim piece removably secured to the second attachment feature of the carrier;
at least one molding member removably secured to the first attachment feature of the carrier and arranged adjacent the at least one trim piece;
a nut connected to the carrier or the vehicle window opening; and
a fastener extending between the vehicle window opening and the carrier and engaging the nut to removably secure the carrier, the at least one trim piece, and the at least one molding member to the vehicle window opening,
wherein the first attachment feature of the carrier is a flange member having a plurality of protrusions extending from a first surface,
wherein the nut includes a closed end adjacent the first surface.

* * * * *